Oct. 11, 1938.  A. REEKERS  2,132,760

TROLLING SPOON

Filed June 29, 1936

ANDREW REEKERS
INVENTOR

BY James L. Girnau
ATTORNEY

Patented Oct. 11, 1938

2,132,760

UNITED STATES PATENT OFFICE 2,132,760

TROLLING SPOON

Andrew Reekers, Portland, Oreg.

Application June 29, 1936, Serial No. 87,837

5 Claims. (Cl. 43—42)

This invention relates to improvements in artificial fishing lures and more particularly to trolling spoons of the type shown and described in my U. S. Patent, Number 1,471,280.

The principal object of this invention is to provide a spoon of this character with a bait and a hook independently connected with the spoon and adapted to trail behind it in such a way that the spoon will be free to wabble and maneuver in its intended manner without any interference from the bait or the hook.

The particular way in which the bait and hook are attached to the spoon constitutes one of the important features of the invention since it allows free movement of the spoon and permits it to pivot about its longitudinal axis substantially through 180 degrees to thereby present its broad surfaces alternately from side to side.

Another object is the provision of means for readily attaching or detaching various types of bait to be used with the spoon.

These and other objects will appear as my invention is more fully hereinafter described in the following specification, illustrated in the accompanying drawing, and finally pointed out in the appended claims.

Figure 1:
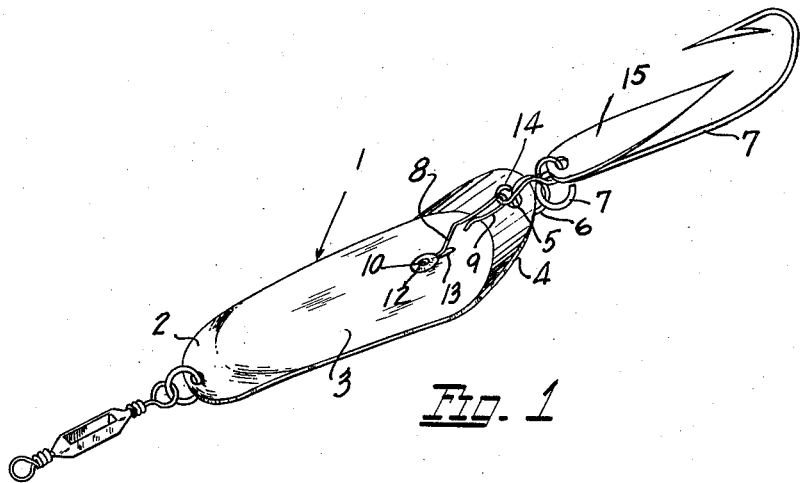
Figure 1 is a perspective view of the invention.

Referring now more particularly to the drawing:

Reference numeral 1 indicates, generally, the main body of the spoon which comprises a downwardly and forwardly inclined end portion 2, a substantially flat central portion 3, and an upwardly and rearwardly extending rear portion 4. The rear portion 4 is apertured as at 5 to receive a ring 6 to which is connected one end of a hook 7.

To the central portion 3 of the main body 1, I secure a bait attaching means 8 in the form of a wire bent back on itself as at 9 to form a spring loop for attaching a bait. The opposite end of the bait attaching means is secured to the body portion 1 by means of a small bolt 10 having a flattened head 11 and a thin flat nut 12. The head of the bolt and the nut are purposely of thin construction to offer minimum resistance in passing through the water. The bolt 10 is extended through an elongated slot 13 of sufficient width to accommodate the secured end of the attaching means 8 so that its thickness, which would otherwise come directly under the head and above the top surface of the spoon, is eliminated.

To the free end of the bait attaching means 8 I attach a link 14 which may be of any suitable shape. The opposite end of the link pivotally connects with any approved form of bait 15.

Figure 2:
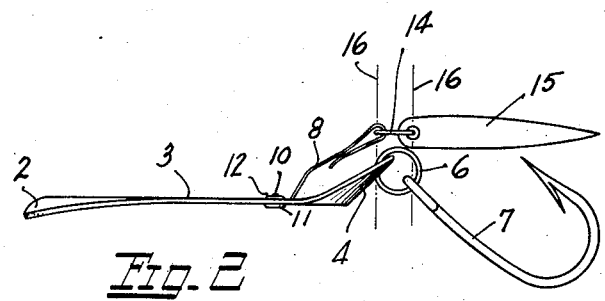
Figure 2 is a side elevation of Figure 1 showing particularly the manner in which the bait and hook are mounted to the spoon for independent movement with respect to each other and to the spoon.

From the foregoing, it will be seen that both the bait and the hook are pivotally connected to the spoon for free and independent movement relative to each other and in separate planes of operation. As illustrated in Figure 2 by parallel center-lines 16, the connection of the link 14 to the bait attaching means is in the same vertical plane as the attachment of the ring 6 to the rearwardly and upwardly inclined portion 4 of the spoon. The point of attachment of the bait to the link 14 and that of the hook to the ring 6 are also in the same vertical plane. This precise arrangement is necessary to the successful functioning of the spoon. The two center-lines 16 may represent two hinge points about which either set of elements may swing without disturbing the other. Regardless of the action of the bait or hook the spoon is allowed free movement about its longitudinal axis to present alternately and fully, as aforesaid, its broad surfaces as it rolls from side to side through approximately 180 degrees.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent, is:—

1. A fishing lure comprising a spoon, a bait pivotally and removably secured to the spoon by two hinged connections, a hook pivotally secured to the spoon by two hinged connections, said hinged connections of the bait and the spoon being in vertical alignment with the hinged connections of the hook.

2. A fishing lure comprising a body member, a hook and a bait each swingably connected with the body member by a plurality of pivotal connections, and the pivotal connections of the hook being in vertical alignment with the pivotal connections of the bait.

3. A fishing lure comprising a wobbler spoon having a flat center portion, a downwardly inclined front portion and an upwardly inclined rear portion, a support extending rearwardly from the flat portion, a bait attached to the support by two hinged connections, a hook pivotally connected with the upwardly turned portion of the spoon by two hinged connections, one of said hinged connections of the bait being in vertical alignment with one of the hinged connections of the hook, and the other of said connections of the bait being in vertical alignment with the other of said hinged connections of the hook.

4. A fishing lure comprising a wobbler spoon having a flat center portion, a downwardly inclined front portion and an upwardly inclined rear portion, a support extending rearwardly from the flat portion, a bait attached to the support by two hinged connections, a hook pivotally connected with the upwardly turned portion of the spoon by two hinged connections, said bait connections being in vertical and longitudinal alignment with the hook connections.

5. A fishing lure comprising a spoon, a support extending toward the rear end of the spoon and in vertical spaced relation with respect thereto, a bait attached to the support by two hinged connections, a hook pivotally connected to the rear edge of the spoon by two hinged connections, and said bait connections being in vertical and longitudinal alignment with each other.

ANDREW REEKERS.